United States Patent [19]

Onder et al.

[11] 4,225,686

[45] Sep. 30, 1980

[54] BLENDS OF COPOLYIMIDES WITH COPOLYAMIDEIMIDES

[75] Inventors: Kemal B. Onder, North Haven; Frank P. Recchia, New Haven, both of Conn.

[73] Assignee: The Upjohn Company, Kalamazoo, Mich.

[21] Appl. No.: 58,798

[22] Filed: Jul. 19, 1979

[51] Int. Cl.² ............................................ C08L 79/08
[52] U.S. Cl. .................................. 525/419; 525/424; 525/432; 525/928
[58] Field of Search ................ 525/419, 424, 432, 928

[56] References Cited

U.S. PATENT DOCUMENTS

| | | | |
|---|---|---|---|
| 3,533,997 | 10/1970 | Angelo | 525/432 |
| 3,592,952 | 7/1971 | Fang | 525/432 |
| 3,708,458 | 1/1973 | Alberino | 528/73 |
| 3,717,696 | 2/1973 | Rochina | 264/205 |
| 3,843,587 | 10/1974 | Keating | 528/73 |
| 3,852,106 | 12/1974 | Incremona | 525/424 |
| 3,929,691 | 12/1975 | Allard | 528/74 |
| 4,107,125 | 8/1978 | Lovejoy | 525/432 |
| 4,142,870 | 3/1979 | Lovejoy | 525/432 |

FOREIGN PATENT DOCUMENTS 51-46916 12/1976 Japan ........................................ 525/424

Primary Examiner—Paul Lieberman
Attorney, Agent, or Firm—James S. Rose; Denis A. Firth

[57] ABSTRACT

Novel polymer blends are disclosed comprising about 10 to 95 percent by weight of a copolyimide (A) prepared from benzophenone-3,3',4,4'-tetracarboxylic acid dianhydride and a mixture of 4,4'-methylenebis(phenyl isocyanate) and toluene diisocyanate (2,4- or 2,6-isomer or mixtures thereof) with the isocyanates used in a molar percent ratio from about 10/90 to 30/70 respectively; and from about 90 to 5 percent by weight of a copolyamideimide (B) prepared from 4,4'-methylenebis(phenyl isocyanate) and a mixture of trimellitic anhydride and isophthalic acid with the acid components used in a molar percent ratio from about 70/30 to 90/10 respectively.

The novel blends may be used in the form of their dry blend or in solution and the films produced therefrom are characterized by improved elongation and tear strength values over those for the copolyimide (A) alone. Furthermore, the softening point of the blends is increased over the copolyamideimide alone.

11 Claims, No Drawings

BLENDS OF COPOLYIMIDES WITH COPOLYAMIDEIMIDES

BACKGROUND OF THE INVENTION

1. Field of the Invention

This invention relates to novel blends of polymers and is more particularly concerned with blends comprising certain copolyamideimides with certain copolyimides.

2. Description of the Prior Art

In U.S. Pat. No. 3,708,458 there is disclosed a series of copolyimides which are derived from benzophenone tetracarboxylic acid dianhydride (BTDA) and either a mixture of 4,4'-methylenebis(phenyl isocyanate) and toluene diisocyanate I2,4- and/or 2,6-isomers) or a mixture of the corresponding diamines. A particularly preferred class of copolyimides arising from that disclosure contains from about 70 to about 90 percent of the recurring units derived from tolune diisocyanate or the corresponding diamine while the remaining 10 to 30 percent of the recurring units are derived from 4,4-methylenebis(phenyl isocyanate) or the corresponding diamine.

Amongst the advantageous properties of the above copolyimides, including their excellent resistance to high temperatures, is their good solubility in dipolar organic solvents, particularly the preferred class of polymers defined above. However, because of the stiffness of the polyimide backbones of the polymers, properties such as the elongation and tear strength of films made therefrom are sometimes of lower values than are generally desired.

U.S. Pat. Nos. 3,717,696, 3,929,691, and 3,843,587 disclose various aromatic polyamideimides which contain amideimide linkages arising typically from the reaction of mixtures such as trimellitic anhydride and terephthalic acid or isophthalic acid with 4,4-methylenebis(phenyl isocyanate); or more complex copolyamideimides arising from mixtures which contain, in addition to the above typical ingredients, a further aromatic dianhydride, and even a second aromatic diisocyanate ingredient (see U.S. Pat. No. 3,843,587).

These aromatic pilyamideimides are characterized by good properties, however, their glass transition temperatures, and thus their ultimate resistance to elevated temperatures, are not always as high as is desirable.

We have now discovered that, by simply blending a copolyimide in accordance with U.S. Pat. No. 3,708,468 with a copolyamideimide in accordance with the prior art, the elongation and tear strength of articles, particularly those of films prepared from such blends, are greatly enhanced over the corresponding values for articles made solely from the copolyimide.

More surprising is the discovery that physical properties such as propagating tear strength and tensile modulus values for films prepared from 50/50 w/w blends in accordance with the present invention have values greater than either one of the blend components taken alone.

Further, the softening point, and thus high temperature resistance, of articles prepared from blends in accordance with the present invention is higher when compared to the softening point of the polyamideimide alone.

SUMMARY OF THE INVENTION

This invention comprises a polymer blend comprising (A) from about 10 percent to about 95 percent by weight of a copolyimide having the recurring units

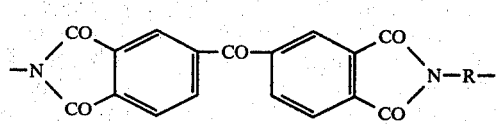

w herein from about 10 to about 30 percent of said recurring units are those in which R represents

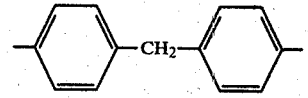

and the remainder of said units are those in which R represents a member selected from the group consisting of

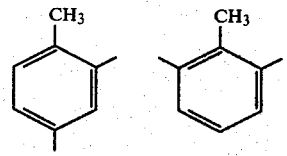

and mixtures thereof; and
(B) from about 90 to about 5 percent by weight of a copolyamideimide having from about 70 to about 90 percent of the recurring units of the formula

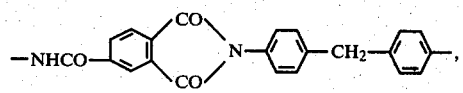

and the remaining 30 to 10 percent of the recurring units of the formula

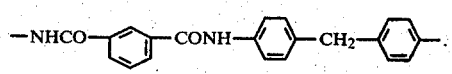

This invention also comprises polymer solutions comprised of a dipolar aprotic solvent and the polymer blends disclosed above.

The blends of the invention can be employed for any of the uses to which high temperature resistant polyimides are currently put in the art. For example, the blends of the invention can be molded in the form of bushings, seal faces, electric insulators, compressor vanes and impellers, pistons and piston rings, gears, thread guides, cams, brake linings, clutch faces, abrasive articles and the like.

The solutions of the blends can be employed in the preparation of coating compositions and can thereby be employed in wire coating and decorative enamels and in the casting or spraying of films on a variety of substrates such as metal, ceramic, fabrics, polymerics and the like. Further, the solutions of the blends can be employed in the spinning of high temperature resistant fibers.

The organic solvent soluble polymer blends of the invention also show advantages over high temperature resistant polyimides hitherto known in that their properties enable them to be used to produce articles having reinforcing or modifying fillers and the like incorporated therein. Thus, fillers such as fiberglass, carbon fibers, graphite, molybdenum disulfide (to impart lubricity), powdered metals such as aluminum, copper and the like, and abrasive materials (for producing grinding wheels and the like) can be added to solutions of the soluble blends of the invention and intimately mixed therewith prior to removal of solvent followed by heat pressing or like techniques necessary to achieve production of the desired article. Other processing advantages which accrue from the high temperature resistance, solvent solubility and thermoplasticity of these blends of the invention will be apparent to one skilled in the art.

DETAILED DESCRIPTION OF THE INVENTION

The novel blends of the present invention comprise the copolyimide (A) defined above in the proportions of about 10 to about 95 percent by weight with the copolyamideimide (B) defined above in the complementary proportions of about 90 to about 5 percent by weight. In a preferred blend in accordance with the inention (A) and (B)are present in the proportions of about 50 to about 80 percent and 50 to 20 percent by weight respectively.

The blends in accordance with the invention can be prepared in any convenient form known to those skilled in the polymer art including dry blending, solution blending, spray blending, and the like.

In one preferred embodiment the copolyimide (A) and copolyamideimide (B), preferably both in finely divided form, are dry blended simply by mixing the two together, using any convenient means for mixing powdered materials and in the proportions by weight falling within the ranges set forth above. If only small amounts of ingredients are being combined then blending by hand mixing can be used. Preferably, and, in the case of large quantities of (A) and (B), machine mixing is employed using mechanical ball-mills, Henschel mixers, powder mills and the like.

In another preferred embodiment, solution blending is employed wherein one, and preferably both, ingredients are dissolved in solvent and the two solutions are then combined using any convenient means for mixing solutions known to those skilled in the art. The proportion of each polymer solution used is chosen, depending on the polymer solids content of each solution, such that when the weight percent proportion of (A) and (B) present in the final solution will fall within the ranges set forth above.

The percent by weight of polymer solids in the respective solutions of (A) and (B), and in the final polymer blend solution, is not in any way critical by simply chosen for convenience. Typically, the solids content for any of the above solutions can be from about 5 percent to about 50 percent by weight.

The solvents employed for (A) and (B) are dipolar aprotic solvents and can be the same or different for each component so that the polymer blends in accordance with the present invention will be dissolved in at least one dipolar aprotic solvent. Illustrative but not limiting are the following solvents: dimethylformamide, dimethylacetamide, dimethylsulfoxide, dimethylsulfone, hexamethylphosphoramide, N-methylpyrrolidone, tetramethylenesulfone, tetramethylurea, pyridine, and the like.

The polymer blends may be left in solution to be used in that form if films, fibers, impregnation of laminates, or the like are contemplated. Alternatively, if desired, the solid blend can be obtained from the solution using techniques known to those skilled in the art. For example, by adding non-solvents for the polymers (A) and (B) such as acetone, tetrahydrofuran, methylethylketone, chloroform, xylene, benzene, hexane, and the like, the polymer blend will precipitate from the dipolar aprotic solution and can be isolated therefrom.

The copolyimide (A) comprising the recurring units of formula (I) is prepared according to the procedures described in U.S. Pat. No. 3,708,458 cited supra whose disclosure with respect thereto is incorporated by reference herein.

In a preferred polymer blend in accordance with the present invention about 20 percent of the recurring units (I) are those in which R represents the 4,4-methylenebisphenylene radical and in the remainder of said units R represents the 2,4-tolylene radical, 2,6-tolylene radical, or mixtures thereof.

The copolyamideimide (B) comprising the recurring units (II) and (III) is readily prepared in accordance with the methods taught in U.S. Pat. Nos. 3,929,691 whose disclosure with respect thereto is incorporated by reference herein. Thus the copolyamideimide (B) is readily obtained from the reaction of a mixture of trimellitic anhydride and isophthalic acid, in the molar percent proportions of from about 70 to about 90 percent of the former and from about 30 to about 10 percent of the latter, with about an equivalent 100 molar percent proportion of 4,4'-methylenebis(phenyl isocyanate) using the procedure set forth in the patent cited supra.

In a preferred polymer blend in accordance with the present invention said copolyamideimide (B) has about 80 percent of the recurring units of the formula (II) and the remaining 20 percent of the formula (III).

Surprisingly, the dry polymer blends in accordance with the present invention can be formed into molded parts under relatively mild conditions of temperature and pressure notwithstanding the high proportion of copolyimide material present in the blend. The parts are easily prepared by molding at a temperature of from about 300° to about 350° C. under a pressure of from about 2000 psi to about 10000 psi using conventional molding equipment and heated presses known to those skilled in the art. Also, the blends can be sinter molded.

It is in the films and foils produced from the polymer blends of the present invention that the most surprising and unexpected properties are observed. The films are characterized by excellent elongation and tear strength in spite of the presence of the copolyimide component and an unexpectedly high tensile modulus and propagating tear strength.

The films are prepared from the solutions of the polymer blends using standard film making techniques known to those skilled in the art. Typically, solutions can be cast on glass, metal, ceramic, and the like, and, if reproducible film thickness is desired, it is preferable to pass a doctor knife, preadjusted to the proper gap, over the cast solution.

Curing of the film is readily accomplished by heating it slowly up to a temperature of from about 220° C. to about 275° C., and preferably under reduced pressure when the higher temperatures are reached. In a most preferred curing process the cast film is heated first at a temperature of from about 60° C. to about 100° C. for a period of from about 2 to about 4 hours, followed by about 200° to 225° C. for about 2 to about 8 hours under a vacuum of from about 10 to about 0.1 mm of mercury, and finally at about 225° C. to about 275° C. for about 0.5 to 1.0 hour.

Orientation of the films can be readily achieved if desired by carrying out any or all of the curing steps as set forth above with the films under tension in any desired direction.

The following examples describe the manner and process of making and using the invention and set forth the best mode contemplated by the inventors of carrying out the invention but are not to be construed as limiting.

PREPARATION 1

A predried 2 gallon reactor was charged with 614.82 g (3.20 moles) of trimellitic anhydride and 132.90 g (0.80 mole) of isophthalic acid. The reactor was fitted with a thermometer, condenser, stirrer, and nitrogen inlet.

Into a ½ gallon dry bottle was weighed 1000.96 g. (4.0 mole) of 4,4'-methylenebis(phenyl isocyanate) (MDI) followed by 434 ml. of N-methylpyrrolidone (NMP) which dissolved the MDI. The MDI solution was added to the reactor followed by 3650 ml. of NMP which had been used to rinse the bottle in which the MDI had been weighed.

Under a stirring rate of 65 r.p.m. and a nitrogen atmosphere the solution was heated from 53° C. to 170° C. over a period of 3 hours and 40 minutes and for a further 1 hour and 55 minute period at 169°–171° C.

Thus there was obtained a 25% by weight solution in NMP of a random copolyamideimide wherein approximately 80 percent of the recurring units had the structure

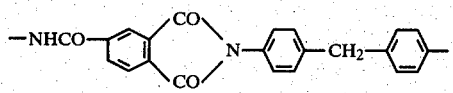

and approximately 20 percent of the recurring units had the structure

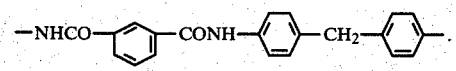

The copolyamideimide had an ηinh at 30° (0.5% in NMP)=0.603.

The bulk viscosity of a sample of the polymer solution was determined by the Brookfield method at about 23° C. to be 10,880 cps (average of 5 determinations).

Films of the copolyamideimide were made by casting the 25% NMP solution on clean glass plates using a Gardner doctor knife set at a 20 mil gap (knife manufactured by Gardner Laboratory, Inc., Bethesda, Md.

The castings were dried first for 3.5 hours at 100° C. then at 220° C. under a pressure of about 0.1 mm of Hg for 8 hours, and finally at 250° C. for 0.5 to 0.75 hour.

The films so produced were characterized by the following properties.

| | |
|---|---|
| Tensile str. (psi) | 14,710 |
| Elongation (%) | 18.9 |
| Tensile modulus (psi) | 226,400 |
| Initial tear str. (pli) | 1660 |
| Propagating tear "split tear" (gm./mil) | 8.0 |
| Film clarity | Excellent |

PREPARATION 2

Using a procedure in accordance with the disclosure of U.S. Pat. No. 3,708,458 there was prepared a 21% by weight solution in dimethylformamide of a random copolyimide wherein approximately 20 percent of the recurring units had the structure

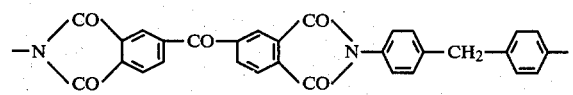

and approximately 80 percent had the structure

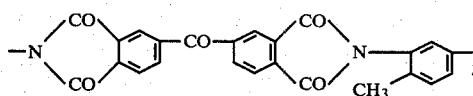

The copolyimide had an ηinh at 30°(0.5% in DMF)=0.65.

The bulk viscosity of a sample of the polymer solution was determined by the Brookfield method at about 25° C. to be 32,000 cps.

Films of the copolyimide were made by casting 20 mil thick layers of the 21% DMF solution on glass plates using the doctor knife described in Preparation 1.

The castings were dried then cured on frames at 220° C. for 6 hours followed by a 2 hour period in which the temperature was raised from 220° C. to 255° C. and then slowly cooled.

The films so produced were characterized by the following properties.

| | |
|---|---|
| Tensile str. (psi) | 18,679 |
| Elongation (%) | 9.2 |
| Tensile modulus (psi) | 346,000 |
| Initial tear str. (pli) | 1243 |
| Propagating tear "split tear" (gm./mil) | 5.3 |
| Film clarity | Excellent |

EXAMPLE 1

A polymer solution in accordance with the present invention was prepared by blending together a sample of the copolyamideimide solution prepared in accordance with Preparation 1 with a sample of the copolyimide solution prepared in accordance with Preparation 2. The two solutions were blended in such proportions to provide for a solids content in the final blend of 90 percent by weight of the copolyamideimide to 10 percent by weight of the copolyimide.

To ensure proper blending of the two viscous polymer solutions, the mixing was carried out on a mechanical tumbler for 24 hours.

Three separate films were cast from the polymer solution using a 20 mil knife gap and the apparatus and method described above in Preparation 1. Curing of the films was accomplished by the following drying steps: first at 80° C. for several hours, then 100° C. for several hours, followed by 220° C. under vacuum (about 0.1 mm of Hg) for 8 hours, finally 250° C. for 15 to 30 minutes.

The films were characterized by the following properties.

| | |
|---|---|
| Tensile str. (psi) | 14,510 |
| Elongation (%) | 17.1 |
| Tensile modulus (psi) | 223,700 |
| Initial tear str. (pli) | 1630 |
| Propagating tear "split tear"(gm./mil) | 8.2 |
| Film clarity | Excellent |

EXAMPLE 2

A polymer solution in accordance with the present invention containing a solids content of 50/50 percent by weight of copolyamideimide/copolyimide was prepared using the solutions and procedure described in Example 1.

Three films were cast from the polymer solution using a 20 mil knife gap and the apparatus and method described above. The films were cured in an air-oven at 80° to 100° C. for about 3 hours (filmed turned cloudy), then 220° C. under vacuum (about 0.1 mm of Hg) for 8 hours, finally at 250° C. for about 30 minutes.

The films were characterized by the following properties.

| | |
|---|---|
| Tensile str. (psi) | 15,750 |
| Elongation (%) | 13.6 |
| Tensile modulus (psi) | 369,000 |
| Initial tear str. (pli) | 1480 |
| Propagating tear "split tear" (gm./mil) | 8.6 |
| Film clarity | Slightly Cloudy |

A second 50/50 percent by weight polymer solution in accordance with the present invention was prepared using the same copolyimide solution described in Preparation 2. The copolyamideimide solution used was prepared in identical manner to the procedure described in Preparation 1 but in a different batch.

Films were prepared from the copolyimide solution (PI), the copolyamideimide solution (PAI), and the 50/50 mixture (PAI/PI) using the procedure described above.

The TMA (thermomechanical analysis) softening points were determined for the three films using the Dupont 990 Thermal Analyzer in the TMA mode and using a 50 g. loading on the penetration probe.

| |
|---|
| PI = 275° C. |
| PAI = 257° C. |
| PAI/PI = 270° C. |

EXAMPLE 3

A polymer solution in accordance with the present invention containing a solids content of 20/80 percent by weight of copolyamideimide/copolyimide was prepared using the solutions and procedure described in Example 1.

Three films were cast at a 20 mil knife gap using the apparatus and method described above. Because of the high bulk viscosity of the cast polymer solution, a lot of streaking (visible lines) resulted in the films made. The streaking does not affect film properties or clarity.

| | |
|---|---|
| Tensile str. (psi) | 18,820 |
| Elongation (%) | 10.8 |
| Tensile modulus (psi) | 320,100 |
| Initial tear. str. (pli) | 1320 |
| Propagating tear "split tear" (gm./mil) | 7.0 |
| Film clarity | Excellent |

EXAMPLE 4

A 13% by weight solution in tetramethylenesulfone of the copolyamideimide prepared as described in Preparation 1 was extruded into water to form solid strands of the polymer. The strands were chopped and thoroughly dried and then ground to a powder in a Fitzmill to pass 40–100 mesh followed by a further screening to pass 60 mesh (U.S. standard sieve).

A solution of the copolyimide prepared in accordance with Preparation 2 was extruded into water using the same procedure as above and the strands were ground to a powder to pass 40–100 mesh in a Fitzmill.

A 50/50 weight percent dry blend in accordance with the present invention was prepared by thoroughly hand-mixing equal parts by weight of the two powdered polymers obtained above.

Molded plaques of each of the starting polymers and of the blend were prepared using a stainless steel mold with mold dimensions of 2½"×5"×0.1". The powders were charged to the mold and pressed under the following conditions.

| |
|---|
| Copolyamideimide: 330° C., 3000 psi, 5 minutes |
| Copolyimide: 320° C., 40000 psi, 5 minutes |
| 50/50 Blend: 330° C., 4000 psi, 5 minutes |

The properties of the molded pieces were as follows:

| | Copoly-amideimide | Copolyimide | 50/50 Blend |
|---|---|---|---|
| Tensile str.,psi | 16,910 | 15,400 | 14,660 |
| Tensile modulus,psi | 288,600 | 313,300 | 311,600 |
| Elongation, % | 27.1 | 7.3 | 9.0 |
| Izod Impact ⅛" notched ft./lbs./inch of notch | 3.99 | 1.42 | 2.16 |

We claim:

1. A polymer blend comprising (A) from about 10 to about 95 percent by weight of a copolyimide having the recurring units

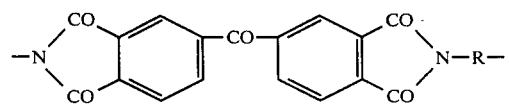

wherein from about 10 to about 30 percent of said recurring units are those in which R represents

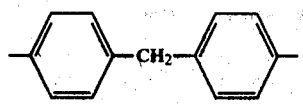

and the remainder of said units are those in which R represents a member selected from the group consisting of

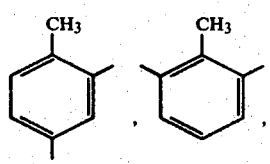

and mixtures thereof; and (B) from about 90 percent to about 5 percent by weight of a copolyamideimide having from about 70 to about 90 percent of the recurring units of the formula

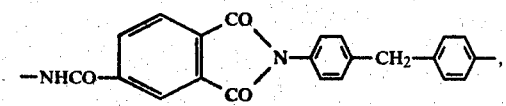

and the remaining 30 to 10 percent of the recurring units of the formula

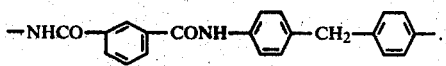

2. A polymer blend according to claim 1 wherein said copolyimide (A) has about 20 percent of said recurring units in which R represents

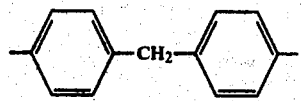

and the remainder of said units are those in which R represents a member selected from the group consisting of

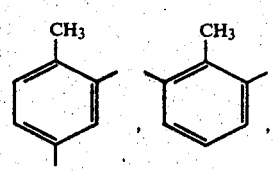

and mixtures thereof.

3. A polymer blend according to claim 1 wherein said copolyamideimide (B) has about 80 percent of the recurring units of the formula

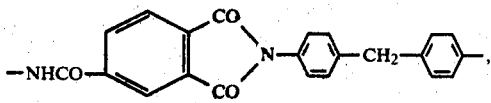

and the remaining 20 percent of the recurring units of the formula

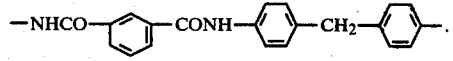

4. A polymer blend according to claim 1 wherein said copolyimide (A) is present in about 50 to about 80 percent by weight and said copolyamideimide (B) is present in the remaining 50 to 20 percent by weight.

5. A polymer blend comprising (A) from about 50 to about 80 percent by weight of a copolyimide having the recurring units

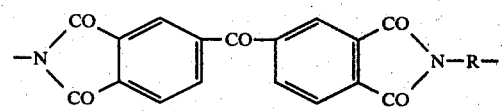

wherein about 20 percent of said recurring units are those in which R represents

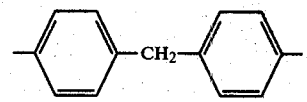

and the remainder of said units are those in which R represents a member selected from the group consisting of

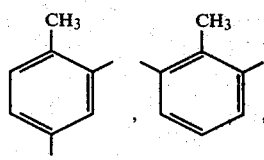

and mixtures thereof; and (B) from about 50 to about 20 percent by weight of a copolyamideimide having about 80 percent of the recurring units of the formula

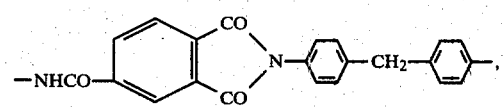

and the remaining 20 percent of the recurring units of the formula

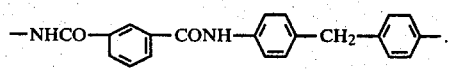

6. A polymer blend according to claim 5 wherein said copolyimide (A) is present in about 50 percent by weight and the copolyamideimide (B) is present in the remaining 50 percent.

7. A polymer solution comprised of a dipolar aprotic solvent and a solids content comprising (A) from about 10 to about 95 percent by weight of a copolyimide having the recurring units

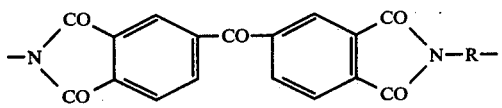

wherein from about 10 to about 30 percent of said recurring units are those in which R represents

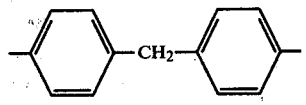

and the remainder of said units are those in which R represents a member selected from the group consisting of

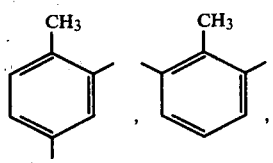

and mixtures thereof; and (B) from about 90 to about 5 percent by weight of a copolyamideimide having from about 70 to about 90 percent of the recurring units of the formula

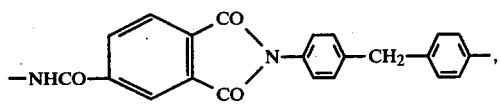

and the remaining 30 to 10 percent of the recurring units of the formula

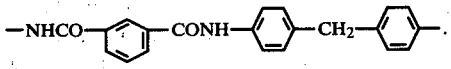

8. A polymer solution according to claim 7 wherein said copolyimide (A) has about 20 percent of said recurring units in which R represents

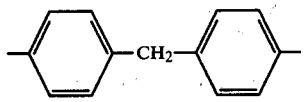

and the remainder of said units are those in which R represents a member selected from the group consisting of

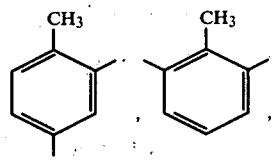

and mixtures threof; and said copolyamideimide (B) has about 80 percent of the recurring units of the formula

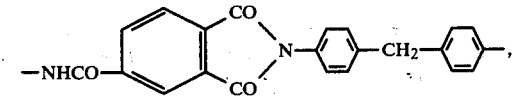

and the remaining 20 percent of the recurring units of the formula

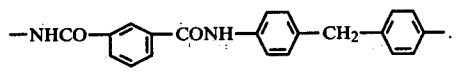

9. A polymer solution according to claim 8 wherein said copolyimide (A) is present in about 50 to about 80 percent by weight and said copolyamideimide (B) is present in the remaining 50 to 20 percent by weight.

10. A polymer solution according to claim 9 wherein said (A) and (B) are present in about 50/50 percent by weight proportions.

11. A film prepared from a polymer solution claimed in any one of claims 7, 8, 9 or 10.

* * * * *

UNITED STATES PATENT OFFICE
CERTIFICATE OF CORRECTION

Patent No. 4,225,686  Dated September 30, 1980

Inventor(s) Kemal B. Onder and Frank P. Recchia

It is certified that error appears in the above-identified patent and that said Letters Patent are hereby corrected as shown below:

Column 1, line 17 "I2,4-" should read --(2,4- --; column 1, line 23 "4,4-" should read --4,4'- --; column 1, line 40, "4,4-" should read --4,4'- --; column 1, line 46 "pilyamide-imides" should read --polyamideimides--. Column 2, formula at line 40, Roman numeral "(II)" missing under formula. Column 3, line 58 "by" should read --but--. Column 4, line 21 "4,4-" should read --4,4'- --. Column 5, line 60 "Md." should read --Maryland).--. Column 6, line 45 "18,679" should read --18,680--. Column 7, line 27 "(filmed" should read --(films--. Column 8, line 41 "40000 psi" should read --4000 psi--.

Signed and Sealed this

Twenty-first Day of April 1981

[SEAL]

Attest:

RENE D. TEGTMEYER

Attesting Officer    Acting Commissioner of Patents and Trademarks